Dec. 24, 1935.  V. P. REYNOLDS  2,025,673

BRAKE

Filed July 30, 1934

Inventor
Vernon P. Reynolds
By A. Trevor Jones
Atty.

Patented Dec. 24, 1935

2,025,673

UNITED STATES PATENT OFFICE 2,025,673

BRAKE

Vernon P. Reynolds, Chicago, Ill., assignor to Bendix Products Corporation, South Bend, Ind., a corporation of Indiana Application July 30, 1934, Serial No. 737,507

5 Claims. (Cl. 188—79.5)

This invention relates to brakes and more particularly to an internal expanding automobile brake, this type of brake being shown, for example, in the La Brie Patent No. 1,824,052.

In present-day internal expanding automobile brakes, the brake shoes, while relatively movable to expand them into contact with a revolving drum, are also desirably in a floating state and connected together so as to be slightly movable as a unit in the direction of rotation of the brake drum; this causes the momentum of the car to increase the brake pressure and produces what is known as a self-energizing action which multiplies the pedal pressure.

The present invention aims to provide simple and inexpensive means for supporting the brake shoes in proper position with respect to the drum and at the same time for a maximum freedom of movement for the purposes of this self-energizing action consistent with such a fixed support.

In one aspect also, the invention includes with the foregoing, improved provision for easily and quickly adjusting the brake shoes in their proper relation to the drum, the two provisions above referred to being desirably incorporated in a substantially single structure.

The invention will be readily understood by reference to the accompanying drawing, in which—

Figure 1:
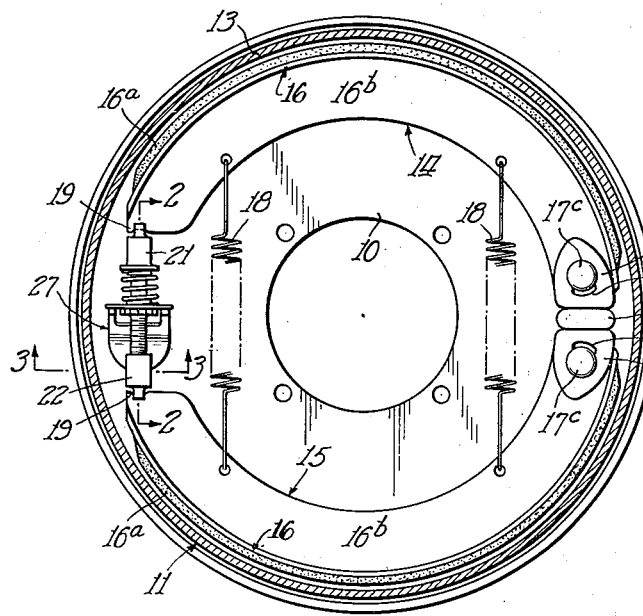
Figure 1 is a vertical section through the brake just inside of the head of the brake drum, and showing the brake shoes together with my present improvement in side elevation.

In the illustrative construction shown in the drawing, a relatively fixed support such as the backing plate 10 is shown in the form of a disk which might be carried, in any suitable manner not necessary to be here shown, by the axle housing (for a rear wheel) or by the wheel knuckle (for a front wheel) of an automobile. The usual brake drum 11 is attached to the wheel in a conventional manner not here shown and is adapted to rotate therewith adjacent the plate 10 and concentric therewith, the plate serving somewhat as a closure for the open side of the cup-shaped drum, the head 12 and annular flange 13 of which provide a revolving enclosure housing the brake shoes.

The usual brake shoes 14, 15 may be of somewhat T-shape and carry suitable friction-producing linings 16a with which the cross-member 16 of each brake is faced, and which are adapted to be pressed against the inner surface of the annular flange 13 of the drum to retard rotation thereof.

To effect this last-mentioned result, a cam or other expansion member 17 is actuated by conventional means to expand the brake shoes 14, 15 radially apart when the brakes are applied. When the brakes are released, the usual expansion springs 18 which tie the brakes together, retract the friction surfaces 16a from pressing engagement with the drum. The ends of the shoes adjacent the cam may be provided with cam abutment members 17a carried by the shoes respectively and having slots 17b therein through which pass the anchor pins 17c on which the shoes have limited movement.

Upon the application of the brakes as described, if the drum is revolving in clockwise direction as by reason of movement of the car to the right in Figure 1, rotation of the drum will tend to move first the lower or primary brake shoe 15 somewhat circumferentially in the direction of rotation of the drum; and for purposes of the self-energizing action of the brakes, this somewhat circumferential action of the lower or primary brake shoe 15 is desirably permitted to be transmitted to the upper or secondary brake shoe 14. Thus at least the primary shoe should be permitted to move in this somewhat circumferential movement to move the two shoes as a unit, while at the same time the shoes are supported in proper position for their somewhat radial movement first under the action of the cam 17 and then under the action of the springs 18. By reason of such action of the primary shoe, the secondary shoe is pressed into engagement with the drum at its left-hand end in Figure 1 through the connection with the shoe 15 at the end of the latter opposite the cam, the braking action thus being materially enhanced.

For this purpose, I have provided novel and simple supporting means for the shoes as a unit desirably at the side of the brake opposite the cam 17.

As here shown, the ends of the web portions 16b of the brake shoes 14, 15 at the left-hand side of the brake, are notched as at 19 and are loosely interengaged with the cross-notched ends 20 of a pair of nuts 21, 22, the upper nut 21 engaging the shoe 14 and the lower nut 22 engaging the shoe 15. Connecting the nuts 21, 22 is a rigid metallic rod 23 threaded at each end as at 24, these threads being of the same pitch but oppositely directed. The threaded ends of the rod 23 are screwed into the nuts 21, 22 respectively which are correspondingly oppositely threaded to receive the rod. Thus rotation of the rod in one direction will draw the nuts 21, 22 closer together and rotation in the opposite direction will move them farther apart. The springs 18, and particularly spring 18 nearest the rod 23, serve to maintain each of the brake shoes 14, 15 in interengagement with its respective nut.

Intermediately of the ends of the rod 23 I have shown a star wheel 25 conveniently formed integrally with the rod 23, and by which the rod may be rotated, as, for example, by the insertion of a screw driver or other tool through the aperture 26 in the plate 10. In accordance with my invention, I provide a resilient support for the shoes as a unit, this support being adjustable not only manually but also self-adjustable as next described, the shoes being desirably supported directly upon the connection between them provided by the rod 23.

Figure 2:
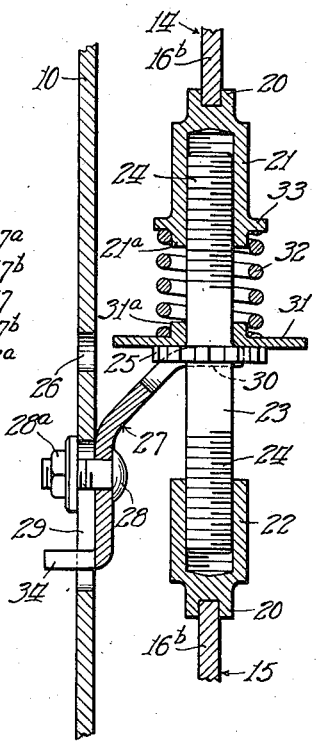
Figure 2 is a partial vertical cross-section taken on the line 2—2 of Figure 1, somewhat enlarged.
Figure 3:
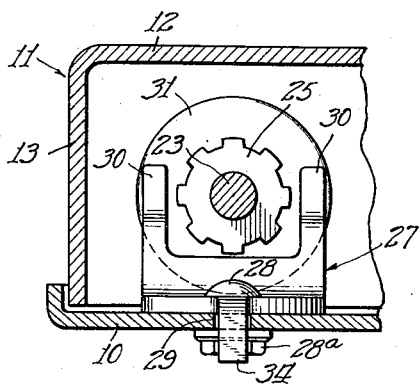
Figure 3 is a section looking upwardly on the line 3—3 of Figure 1, also enlarged, the head of the drum being here also shown.

In the construction shown in Figures 1 to 3 inclusive, I have shown a bracket 27 mounted on the plate 10 by means of a bolt-and-nut attaching member 28 which passes through a vertically extended slot 29 in the plate. The bracket 27 desirably has a bifurcated inner end such as the two fingers 30 which are horizontally directed and spaced on each side of the star wheel 25 adapted to be disposed in the same horizontal plane therewith, the bracket however in this instance being out of contact with the star wheel.

Loosely sleeved on the rod 23 I have shown a washer 31 abutting the star wheel on the upper side thereof but larger in diameter than the star wheel so as to rest on the fingers 30. On the rod 23, between the washer 31 and the upper nut 21, I have interposed a compression coil spring 32, pressing at its lower end upon the washer and at its upper end upon the nut 21, the nut advantageously having an annular flange 33 against which the spring bottoms, the nut 21 and washer 31 each advantageously having a neck 21a and 31a respectively serving to center the spring. Thus, assuming that the lower shoe 15 is not already in contact with the drum, as of course it should not normally be, the two shoes as a unit will be supported on the bracket 27 through the intermediation of the spring 32. If the lower shoe 15 should be in contact with the drum when the installation is made, then the bracket 27 may be adjusted manually, as by means of the lug 34 projecting through the slot 29, to raise the bracket to cause the shoes to be supported thereon.

To make the original adjustment of the brakes with my improved device, as for example when first installed, the star wheel 25 may be rotated to move the brake shoes apart until contact is made by both shoes with the drum. Thereupon the nut 28a of the bolt-and-nut member 28 is loosened, so that the bracket 27 is free to move. If the fingers 30 of the bracket are above the star wheel, the spring 32 will move the bracket downwardly until the fingers 30 of the bracket are disposed in the same plane as the star wheel 25, since because of the washer 31 the spring 32 cannot urge the bracket beyond the star wheel. Thereupon, the nut of the bolt-and-nut member 28 should be tightened to fix the bracket in this adjustment and the star wheel then rotated in the opposite direction to back off the brake shoes a suitable distance from the drum to permit free turning of the drum.

Upon rotation of the rod 23, as described, to draw the shoes together, the spring 32 is further compressed between the nut 21 and the washer 31, and thus between the fingers 30 and the nut 21, but because of abutment of the washer 31 with the star wheel 25, the spring cannot draw the rod 23 upwardly, but on the contrary the star wheel 25 will be maintained at all times, in the released position of the brakes, in the plane of the fingers 30, and the shoes 14, 15 will be moved away from their respective segments of drum an equal distance at any vertical plane passing through the drum and the two shoes. This result is also due to the fact that the threads on the rod 23 are of equal pitch at each end.

Thus upon the application of the brakes, with the car moving to the right and the drum rotating clockwise in Figure 1, the circumferential or wrap-around clockwise movement imparted to the lower or primary shoe 15, lifts the shoes as a unit from the support 27 so that the washer 31 is temporarily spaced above the fingers 30, the star wheel 25 passing freely between the fingers for this purpose. This lifting of the shoes as a unit, presses the secondary or upper brake shoe 14 against the drum, augmenting the action of the cam 17. In this unitary movement of the shoes at the connection 23, it will be noted that the spring 32 is neither compressed nor extended, but moving with the shoes as a unit, always serves to maintain the washer 31 in contact with the star wheel 25, so that upon release of the brakes, gravity causes the washer 31 to drop back upon the fingers 30, restoring the star wheel 25 also to the plane of the fingers, the spring 32 merely absorbing the weight of the shoes and acting as a buffer.

Upon reverse movement of the car, that is in the direction toward the left in Figure 1, rotation of the drum in counter-clockwise direction, and application of the cam 17, will cause the upper shoe 14 to become the primary shoe, and will tend to move this upper shoe slightly circumferentially, so that the left-hand end of the lower shoe 15, which is now the secondary shoe, is moved downwardly, to press the shoe 15 against the drum, not only in the region of the cam 17 but also in the region of the connector 23. In this reverse movement, it will be noted that the spring 32 is now further compressed, since the star wheel 25 moves downwardly away from the washer 31, the washer 31 being prevented from downward movement by the fingers 30. Thereafter, upon release of the brakes, the spring 32 moves the star wheel 25 upwardly to restore it to abutment with the washer 31 and thereby to the plane of the fingers 30.

No matter what the force of the spring 32, it cannot move the star wheel above the washer 31, and gravity as well as the action of the spring 32 maintains the washer 31 in engagement with the fingers 30. Consequently, when the star wheel 25 is in the plane of the fingers 30, as it will always be in the released position of the brakes, the shoes 14, 15 will be equidistant from the drum.

Figure 4:
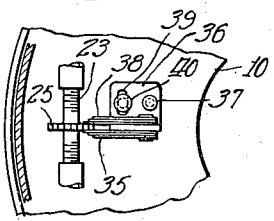
Figure 4 is a fragmentary view similar to Figure 1 and showing a modified construction.

In the modified construction shown in Figure 4, I have provided a resilient support directly supporting the shoes as a unit and in the form of a laminated leaf spring 35 carried by bracket 36 and pivotally mounted as at 37 upon the plate 10. The leaf spring 35 underlies the star wheel 25 and the star wheel 25 rests directly upon the spring 35 in the released position of the brakes. In this construction, upon downward movement of the rod 23, upon application of the brakes, and upon rotation of the drum in a counterclockwise direction, the spring 35 will be flexed by direct contact with the star wheel 25, and thereafter, upon release of the brakes, the spring 35 by its inherent resiliency, resumes its normal position and moves the star wheel 25 upwardly with it to restore the star wheel also to normal position.

In clockwise rotation of the drum, the star wheel 25 will move slightly upwardly away from the spring 35, and while it could thereafter be restored to contact with the spring 35 by the action of gravity upon release of the brakes, I may provide another laminated leaf spring 38 also carried by the bracket 36 but arranged to abut the star wheel 25 upon its upper face and to be flexed by upward movement of the star wheel 25, to enhance the action of gravity in restoring the star wheel to its normal position upon release of the brakes. Initial adjustment of the brakes with the construction shown in Figure 4, may be made quite similarly to the manner already described. In other words, the bracket 36 has a slot 39 therein through which passes a bolt-and-nut member 40, the position of which is fixed on the plate 10. After first expanding the brakes into contact with the drum by initial rotation of the rod 23, the bolt-and-nut member 40, being loosened, the bracket 36 is permitted to move thereon by reason of the slot 39 and is permitted to adjust itself to the position of the star wheel 25, with neither of the springs 35 or 38 flexed. Thereupon, the bolt-and-nut member 40 is tightened to maintain the bracket in this position, and then the rod 23 is rotated in the opposite direction to back off the brake shoes an equal distance from the drum.

Having described my invention, I claim:

1. A brake comprising, in combination, a backing plate, a drum rotatable on an axis fixed with respect to the plate, shoes arranged in end to end relation within said drum adjacent said plate, said shoes being movable radially and circumferentially of the plate into engagement with the drum, means movable with and connecting the shoes and adjustable to spread the shoes apart to compensate for wear, a bracket carried by the plate, and a coil spring carried by the connecting means and supporting the shoes on said bracket.

2. A brake comprising, in combination, a backing plate, a drum rotatable on said axis fixed with respect to the plate, shoes arranged in end to end relation within said drum adjacent said plate, said shoes being movable radially and circumferentially of the drum, a bracket on the plate, means movable with and connecting the shoes and adjustable to spread the shoes apart to compensate for wear, and a coil spring carried by said means and resting on the bracket for directly supporting the shoes, said coil spring resisting movement of the shoes in a downward direction only, the shoes being free to move away from the bracket in an upward direction and the spring during said upward movement moving freely with the shoes without being placed under tension.

3. A brake comprising the combination of two relatively movable shoes, connecting means between the shoes permitting movement thereof as a unit embodying a rod having threads of similar pitch but of opposite direction at each end, a star wheel fixed intermediate the ends of the rod, two nuts having threads of similar pitch but oppositely directed engaging the ends of the rod and each nut having abutting engagement with one of the shoes, an expansion spring connecting the shoes and maintaining the ends of the shoes in abutment with the nuts, a relatively fixed plate adjacent the shoes, a bracket carried by said plate and adjustable thereon, said bracket having bifurcated fingers spaced on each side of said star wheel, a washer loosely abutting the star wheel on the upper side, a coil spring surrounding the rod and pressing at its upper end against the upper nut and its lower end against the washer, said washer being arranged on downward movement of the connecting means to abut the said fingers and to compress the last-mentioned spring, whereby upon release from said downward movement the spring tends to restore the star wheel into abutment with the washer.

4. A brake embodying in combination with a pair of brake shoes, a vertical turnbuckle rod connecting the shoes, a coil spring surrounding the rod, abutments carried by the rod for each end of the spring, a washer between the lower end of the spring and its adjacent abutment, and a relatively fixed support beneath the washer adapted to support the washer thereon, said spring resisting movement of the turnbuckle downwardly when the washer is received on the support.

5. A centralizing device of the class described including the combination with a brake shoe, of a turnbuckle rod connected to the shoe, a star wheel fixed centrally of the rod, an abutment nut at the other end of the rod screwed thereon, a resilient member compressed between the abutment and the star wheel, and a washer interposed between the star wheel and the resilient member.

VERNON P. REYNOLDS.